United States Patent [19]

Johnstone

[11] Patent Number: 4,487,087
[45] Date of Patent: Dec. 11, 1984

[54] BALL NUT HAVING ADUSTABLE PRELOADING

[75] Inventor: Richard Johnstone, Brookfield, Wis.

[73] Assignee: Kearney & Trecker Corporation, Milwaukee, Wis.

[21] Appl. No.: 611,936

[22] Filed: May 21, 1984

Related U.S. Application Data

[63] Continuation of Ser. No. 331,980, Dec. 18, 1981.

[51] Int. Cl.³ .................... F16H 1/18; F16H 1/20; F16H 55/18
[52] U.S. Cl. .................... 74/424.8 A; 74/409; 74/441; 74/424.8 R
[58] Field of Search .................. 74/424.8 A, 441, 469, 74/424.8 R

[56] References Cited

U.S. PATENT DOCUMENTS

| | | | |
|---|---|---|---|
| 2,978,920 | 4/1961 | Sears et al. | 74/441 |
| 3,141,349 | 7/1964 | McDonald | 74/441 |
| 3,198,029 | 8/1965 | Orner | 74/424.8 A |
| 3,304,794 | 2/1967 | Bird | 74/441 |
| 3,323,777 | 6/1967 | McMullen | 74/441 |
| 3,369,422 | 2/1968 | Sears | 74/441 |
| 3,393,576 | 7/1968 | Carlson | 74/441 |
| 3,393,577 | 7/1968 | Better | 74/424.8 A |
| 3,563,107 | 2/1971 | Nilsson | 74/441 |
| 3,638,507 | 2/1972 | Orner | 74/441 |
| 3,721,133 | 3/1973 | Denkowski | 74/441 |
| 3,760,686 | 9/1973 | Goodwin | 74/441 |
| 3,851,541 | 12/1974 | Ploss et al. | 74/441 |
| 3,961,547 | 6/1976 | Shainberg et al. | 74/424.8 A |
| 4,369,011 | 1/1983 | Ploss | 74/424.8 R |

FOREIGN PATENT DOCUMENTS

| | | | |
|---|---|---|---|
| 567725 | 12/1958 | Canada | 74/441 |
| 1935703 | 2/1970 | Fed. Rep. of Germany . | |
| 2014053 | 4/1970 | France . | |
| 2082450 | 12/1971 | France . | |
| 2304001 | 10/1976 | France . | |
| 386809 | 4/1965 | Switzerland . | |
| 1005962 | 4/1962 | United Kingdom . | |
| 396883 | 1/1974 | U.S.S.R. | 74/424.8 A |
| 486171 | 1/1976 | U.S.S.R. | 74/424.8 A |
| 655849 | 4/1979 | U.S.S.R. | 74/424.8 R |
| 744173 | 6/1980 | U.S.S.R. | 74/424.8 A |
| 868202 | 9/1981 | U.S.S.R. | 74/424.8 A |

Primary Examiner—Lawrence J. Staab
Assistant Examiner—Michael D. Bednarek
Attorney, Agent, or Firm—Quarles & Brady

[57] ABSTRACT

An improved ball nut having adjustable preloading comprises a pair of ball nut halves both in threaded engagement with a ball screw. Only one of the nut halves is secured to a movable machine member, the other nut half being movable to the relative fixed nut half. Separating the two nut halves is a pair of concentric sleeves, which are each fabricated from a piezomagnetic material such as nickel or nickel alloy. The sleeves are each keyed to the nut halves to prevent one nut half from rotating independently of the other. Between the sleeves is a magnetic coil which, when energized, causes the sleeves to expand. By varying the coil excitation, the sleeve length, and hence, the force exerted on the ball nut halves by the sleeves can be varied accordingly to vary ball nut preloading.

7 Claims, 4 Drawing Figures

FROM MACH TOOL CONTROL SYSTEM

BALL NUT HAVING ADUSTABLE PRELOADING

This application is a continuation of application Ser. No. 331,980, filed Dec. 18, 1981.

BACKGROUND OF THE INVENTION

This invention relates generally to ball nuts such as are employed in combination with a ball screw or the like to precisely position a moving member such as a machine tool axis slide along a fixed member such as a machine tool base, and more specifically, this invention relates to a ball nut having adjustable preloading.

In the fabrication of various machines, specifically numerically controlled machine tools, it is often desirable to provide for rapid and accurate positioning of a movable member, such as an axis slide in the case of a machine tool, on a fixed member, such as a machine tool bed. The most common means employed for providing rapid and accurate positioning of a movable member on a fixed member are the well known ball screw and ball nut. Typically, the ball screw is journaled into the fixed member parallel to the desired path of movable member movement and the ball nut is affixed to the movable member so as to be in threaded engagement with the ball screw. In operation, the ball screw is rotatably driven by a servo controlled motor in response to numerical control commands to displace the ball nut therealong, thereby precisely positioning the movable member along the fixed member.

Heretofore, when the combination of a ball screw and ball nut have been employed in a machine tool or the like to precisely position a movable member along a fixed member, the ball nut has been affixed to the movable member so that the loading on the ball nut remains fixed during the useful life of the ball nut. Generally, fixing the preload on the ball nut during machine tool fabrication incurs no difficulty during subsequent machine tool use since present day ball screw velocities are low so that fixing ball screw preload to make the ball nut relatively stiff does not place any undue strain on the ball screw. In fact, fixing the ball nut preload to make the ball nut very stiff axially is usually desirable at low ball screw velocities because of the relatively large forces on the ball screw.

The advent of very high speed spindles capable of performing cutting operations at 20,000 rpm and above and the advent of very durable tooling has made present day machine tool feedrates, that is, machine tool axis slide velocities of up to 10 meters/minute (400 inches per minute) too slow to obtain maximum machine tool efficiency during certain machining operations on certain types of material. To obtain maximum machine tool efficiency under such conditions may require feedrates of 100 meters/minute or higher. At such high feedrates and by implication, such high ball screw speeds, it is imperative that ball screw drag be reduced, which is best accomplished by decreasing ball nut preloading as the forces on the ball screw at such high speeds are generally low in comparison to the forces on the screw at low screw speeds. Thus, it is desirable to adaptively vary the preloading on the ball nut in relation to ball screw speed. Heretofore, this has not been possible due to the fact that ball nut preloading was fixed.

To overcome the difficulties attributed to the fixed ball nut preloading, the present invention provides a ball nut whose preloading is adjustable to facilitate large preloads at low ball screw speeds and small preloads and high ball screw speeds.

It is an object of the present invention to provide a ball nut having adjustable preloading.

It is yet a further object of the present invention to provide a ball nut having adjustable preloading such that at high ball screw speeds, ball nut preloading can be made low while at low ball screw speeds, ball nut preloading may be made high.

BRIEF SUMMARY OF THE INVENTION

Briefly, in accordance with the preferred embodiment of the invention, a ball nut having adjustable preloading, which is adapted for threaded engagement on a ball nut or the like, comprises a pair of ball nut halves, each ball nut half being in threaded engagement with the ball screw. One of the ball nut halves is secured by a bracket or the like to a movable member, typically a machine tool axis slide while the remaining ball nut half is free to move relative to the fixed ball nut half. Means for urging the ball nut apart, typically taking the form of a pair of concentric sleeves made from a piezomagnetic material, such as nickel or a nickel-steel alloy, are affixed to both ball nut halves so as to be interposed between the nut halves. Each sleeve is keyed at each end to each of the ball nut halves so that the ball nut halves cannot rotate relative to one another. Between the sleeves is a magnetic coil, which, when energized, generates a magnetic field which causes the sleeves to expand thereby urging the nut halves apart to vary ball nut preloading. By varying the coil excitation, the expansion of the sleeves, and hence the force exerted by the sleeves against the nut halves can be varied accordingly to vary ball nut preloading.

BRIEF DESCRIPTION OF THE DRAWINGS

The features of the invention believed to be novel are set forth with particularity in the appended claims. The invention itself, however, both as to method and organization together with further objects and advantages thereof may best be understood by reference to the following description taken in conjunction with the accompanying drawings in which:

DETAILED DESCRIPTION OF THE PREFERRED EMBODIMENT

Figure 1:
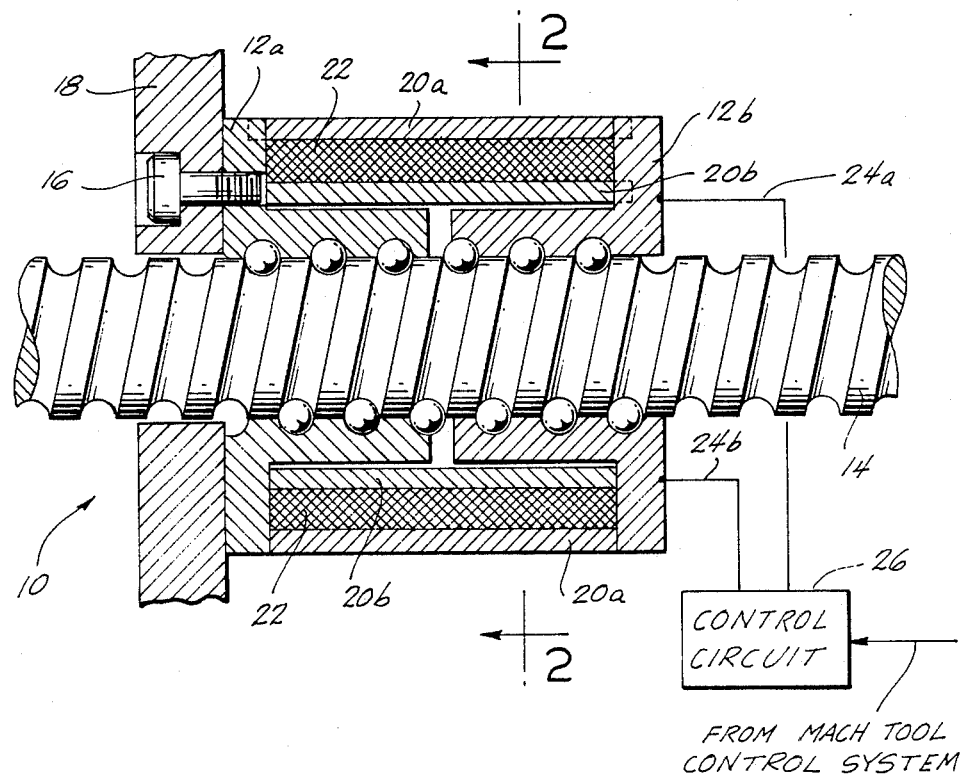
FIG. 1 is a longitudinal cross section of a preferred embodiment of the improved ball nut in accordance with the teaching of the present invention.
Figure 2:
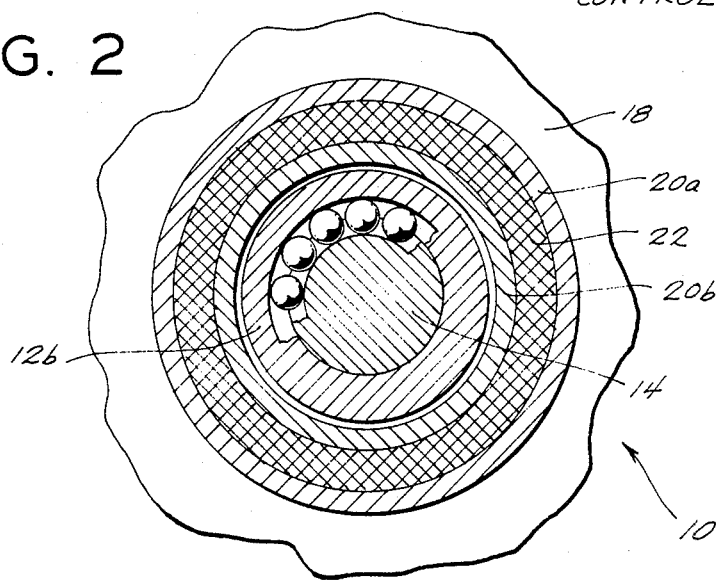
FIG. 2 is a cross sectional view of the ball nut of FIG. 1 taken along lines 2—2 thereof.

An improved ball nut 10, constructed in accordance with the teachings of the present invention, is illustrated in FIGS. 1 and 2, FIG. 1 being a longitudinal cross section of the ball nut and FIG. 2 being a cross sectional view taken along lines 2—2 of FIG. 1. Ball nut 10 comprises a pair of nut halves 12a and 12b, each nut half being in threaded engagement with a ball screw 14 which is typically journaled for rotation in a fixed member, such as the bed of a machine tool (not shown). One of the ball nut halves, such as ball nut half 12a, for example, is secured by bolts 16 (only one of which is shown in FIG. 1) to a bracket 18. In practice, bracket 18 is attached to a movable member (not shown), such as a machine tool axis slide.

Nut halves 12a and 12b are separated by a pair of concentric sleeves 20a and 20b, each sleeve being keyed at its opposite ends to a separate one of the nut halves so as to prevent the nut halves from rotating independently of each other. Sleeves 20a and 20b are each fabricated from a piezomagnetic material, such as nickel or a nickel-steel alloy. The linkage of each nut half to the other by sleeves 20a and 20b causes both halves and hence, the machine tool axis slide, to be displaced along the ball screw as the ball screw is rotatably driven, typically by a servo motor (not shown) under command of the machine tool numerical control system (not shown).

Disposed between sleeves 20a and 20b is an electromagnetic coil 22 whose windings lie perpendicular to the longitudinal axis of the ball screw. When a direct current voltage, is applied to coil leads 24a and 24b, from a control circuit 26, typically a voltage amplifier, in accordance with a control voltage supplied from the machine tool control system, the coil generates a magnetic field whose flux lines pass axially through each of the sleeves. Because each of the sleeves is fabricated from a piezomagnetic material, the sleeves, when subjected to the magnetic field produced by coil 22, tend to expand axially, urging ball nut halves 12a and 12b apart. The axial expansion of each sleeve varies directly with the strength of the magnetic field, which varies in accordance with the current through the coil. Each sleeve, when it expands axially in the presence of magnetic flux lines passing axially therethrough, exerts a force on the ball nut halves to urge them apart, the magnitude of the force varying in direct proportion to the axial expansion of the sleeve, which, as indicated, varies directly with the strength of the magnetic field. Thus, by varying the strength of the magnetic field through control of the excitation applied to the coil, the force against the ball nut halves, and hence, the ball nut preloading can be varied accordingly.

The major advantage of the above-described improved ball nut is that ball nut preloading can thus be varied in accordance with ball screw speeds so that at very high ball screw velocities, ball nut preloading can be reduced to obtain very high machine tool axis slide velocities. Conversely, at low ball screw speeds, the ball nut preloading can be increased by increasing the magnetic coil excitation to increase ball nut loading to obtain very rigid coupling between the ball nut and the screw.

Figure 3:
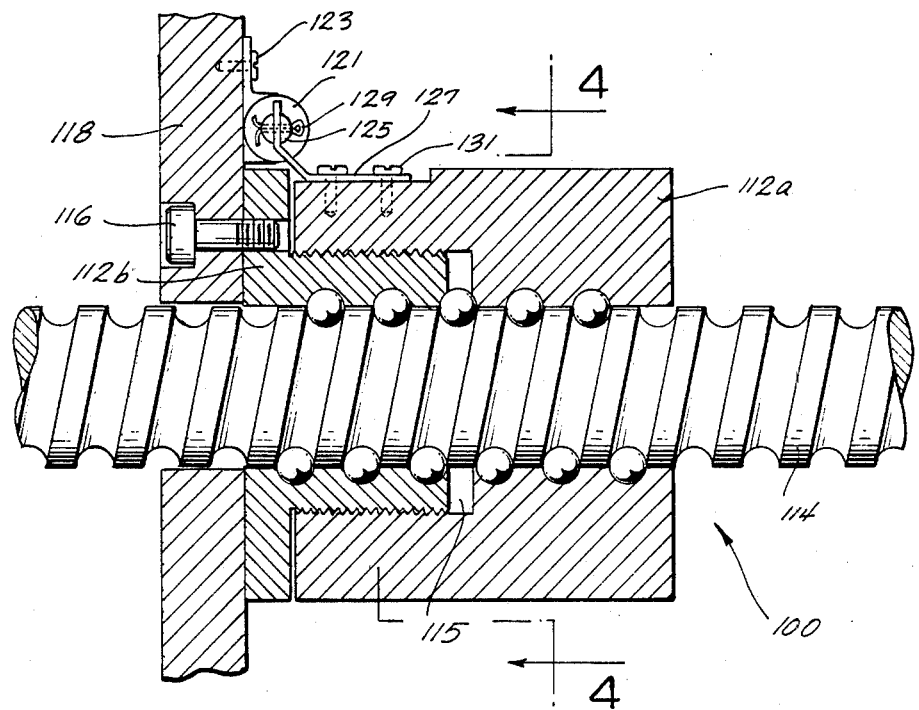
FIG. 3 is a longitudinal cross section of an alternate preferred embodiment of the improved ball nut in accordance with the teachings of the present invention.
Figure 4:
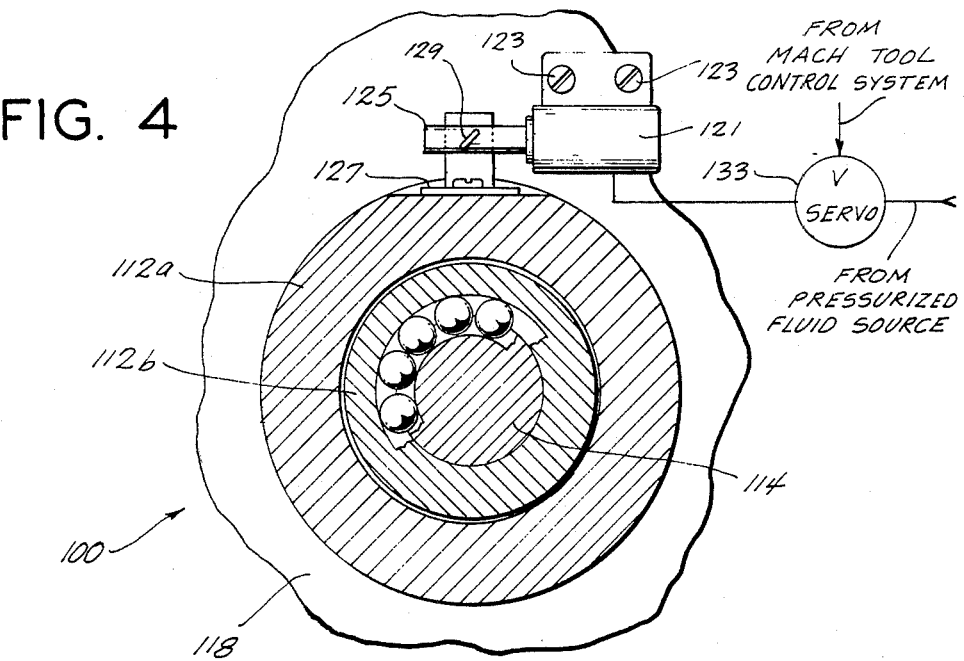
FIG. 4 is a cross sectional view of the ball nut of FIG. 3 taken along lines 2—2 thereof.

An alternate preferred embodiment 100 of an improved ball nut is illustrated in FIGS. 3 and 4, FIG. 3 being a longitudinal cross section of the nut and FIG. 4 being a cross sectional view taken along lines 4—4 of FIG. 3. Ball nut 100 comprises a pair of ball nut halves 112a and 112b, each ball nut half being in threaded engagement with a ball screw 114 which, in practice, is journaled for rotation in a fixed member (not shown), such as a machine tool bed or the like. In the present embodiment, ball nut half 112a has a bore 115 in the leftward face thereof which is threaded to meshingly engage complementary threads on the exterior periphery of ball nut half 112b. Ball nut half 112b is secured by fasteners 116 (only one of which is shown) to a bracket 118 which is secured to a movable member (not shown) such as a machine tool axis slide or the like. By virtue of the threaded engagement between ball nut halves 112a and 112b and by virtue of the linkage of ball nut half 112b to bracket 118, the movable member affixed to bracket 118 is thus displaced axially along ball screw 114 as the ball screw is rotatably threaded through the ball nut halves by a servo controlled motor (not shown) responsive to commands from machine tool control system (not shown).

In the present embodiment, the preload on the ball nut is adjusted by rotating ball nut half 112a relative to ball nut half 112b. To this end, a spring return hydraulic cylinder 121 is secured to bracket 118 by fasteners 123 so that the cylinder shaft 125 is perpendicular to the axis of rotation of the ball screw. As is best illustrated in FIG. 3, cylinder shaft 125 of cylinder 121 is slotted to receive the upright end of a right angle 127 which is secured to the cylinder shaft by cotter pins 129 or the like. The lower end of right angle 127 is secured to ball nut half 112a by fasteners 131.

As is best illustrated in FIG. 4, cylinder 121 is pressurized from a source of pressurized fluid (not shown) through a servo valve 133 which is controlled by the machine tool control system. In this way, the pressurization of the cylinder can be varied in response to machine tool commands.

In operation, cylinder 121 normally remains deactuated at low ball screw speeds so that ball nut half 112a is tightly threaded against ball nut half 112b by virtue of the cylinder shaft being biased into the cylinder. Thus, at low ball screw speeds, the preloading of the ball screw remains high, which is generally desirable. As the ball screw speeds are made very high to obtain rapid machine tool axis slide movement, cylinder 121 is pressurized through valve 133 to loosen the threaded connection between ball nut halves 112a and 112b so as to reduce the preloading on the ball nut. In this way, the loading on the ball nut can be adjusted so that at low ball screw speeds, ball nut preloading is high whereas at high ball screw speeds, ball nut preloading is reduced.

It should be noted, that means other than hydraulic cylinder 121 and servo valve 133 could easily be employed to rotate ball nut half 112a relative to ball nut half 112b to adjust the preloading on ball nut 100. For example, an electric solenoid could easily be substituted for cylinder 121.

While ball nut 100 has adjustable preloading just as ball nut 10 of FIG. 1, ball nut 10 achieves greater overall stiffness by virtue of the ball nut halves being separated by, but keyed to, sleeves 20a and 20b. The greater overall stiffness of ball not 10 lessens the likelihood of chatter as the ball screw threadedly engages the ball nut during axial movement of the machine tool axis slide.

The foregoing describes an improved ball nut having adjustable preloading so that at low ball screw speeds, ball nut preloading may be made high while high ball screw speeds, the ball nut preloading can be reduced.

Although the illustrative embodiments of the invention have been described in considerable detail for fully disclosing a practical operative structure incorporating the invention, it is to be understood that the particular apparatus shown and described is intended to be illustrative only and that various novel features of the invention may be incorporated in other structural forms without departing from the spirit and scope of the invention as described in the subjoined claims.

What is desired secure by U.S. Letters Patent:

1. An improved ball nut having adjustable preloading and adapted for threaded engagement with a ball screw for moving a movable member of a machine, said ball nut comprising:

a first ball nut half in threaded engagement with a ball screw;

a second ball nut half in threaded engagement with said ball screw adjacent to said first ball nut half;

means attaching said second ball nut half to the movable member;

biasing means urging said ball nut halves in opposite directions to vary ball nut preloading; and adjusting means responsive to the rate of relative rotation between said ball nut and said screw and coupled to said biasing means for infinitely varying the force exerted by said biasing means so that said force is automatically reduced as the rate of rotation increases.

2. The invention according to claim 1 wherein said biasing means comprises:

a first and second concentric sleeves coaxial with said ball screw and interposed between said first and second ball nut halves, each of said sleeves being keyed at opposite ends to a separate one of said ball nut halves so as to prevent said ball nut halves from rotating independently of each other, and, each of said sleeves being piezomagnetic so as to change in length in the presence of a magnetic field; and magnetic coil means disposed between said first and second sleeves for generating a magnetic field whose flux lines pass axially through said first and second sleeves causing said sleeves to expand axially to bias said nut halves apart to vary the preloading on said ball nut.

3. The invention according to claim 1 wherein said biasing means comprises:

a spring return hydraulic cylinder fastened to one of said first and second ball nut halves; and means for securing the shaft of said cylinder to the other of said first and second ball nut halves so that when said cylinder is pressurized, said ball nut halves are urged apart from one another and when said cylinder remains depressurized, said ball nut halves are urged toward one another.

4. An improved ball nut having adjustable preloading and adapted for threaded engagement with a ball screw comprising:

a first ball nut half in threaded engagement with a ball screw, said first ball nut half having a threaded bore in one end thereof so as to be coaxial with said ball screw;

a second ball nut half in threaded engagement with said ball screw and said second ball nut being threaded into said bore in said first ball nut half;

bracket means for attaching said second ball nut half to a movable member; and means for rotating said first ball nut half relative to said second ball nut half to vary the ball nut preloading.

5. The invention according to claim 4 wherein said means rotating said first ball nut half relative to said second ball nut half comprises:

a spring return hydraulic cylinder fastened to one of said first and second ball nut halves so that the shaft of said cylinder is perpendicular to the axis of rotation of said ball screw; and means for securing the shaft of said hydraulic cylinder to the other of said first and second ball nut halves so that said first ball nut half is rotated relative to said second ball nut half responsive to pressurization of said hydraulic cylinder 6. An improved ball nut having adjustable preloading, said ball nut threadedly engaging a ball screw so as to displace a movable member secured to said ball nut along the ball screw when the ball screw is rotatably driven comprising:

a first ball nut half in threaded engagement with said ball screw;

a second ball nut half in threaded engagement with said ball screw so as to be in spaced apart relationship with said first ball nut half;

bracket means for attaching a movable member to said second ball nut half;

a first and second concentric sleeves coaxial with said ball screw and interposed between said first and second ball nut halves, each of said sleeves being keyed at its opposite ends to a separate one of first and second ball nut halves, and said first and second sleeves being piezomagnetic so as to change in length in the presence of a magnetic field; and magnetic coil means disposed between first and second sleeves for producing a magnetic field to cause the said sleeves to expand axially to urge said ball nut halves apart to vary ball nut preloading.

7. An improved ball nut having adjustable preloading and adapted for threaded engagement with a ball screw, said ball nut comprising:

a first ball nut half in threaded engagement with a ball screw;

a second ball nut half in threaded engagement with said ball screw adjacent to said first ball nut half;

means attaching said second ball nut half to a movable member;

biasing means secured to said first and second ball nut halves for urging said first ball nut half apart from said second ball nut half to vary ball nut preloading, comprising:

first and second concentric sleeves coaxial with said ball screw and interposed between said first and second ball nut halves, each of said sleeves being keyed at opposite ends to a separate one of said ball nut halves so as to prevent said ball nut halves from rotating independently of each other, and, each of said sleeves being piezomagnetic so as to change in length in the presence of a magnetic field; and magnetic coil means disposed between said first and second sleeves for generating a magnetic field whose flux lines pass axially through said first and second sleeves causing said sleeves to expand axially to bias said nut halves apart to vary the preloading on said ball nut; and adjusting means coupled to said biasing means for varying the force exerted by said biasing means.

* * * * *